(12) United States Patent
V et al.

(10) Patent No.: US 12,282,419 B2
(45) Date of Patent: Apr. 22, 2025

(54) RE-USABLE WEB-OBJECTS FOR USE WITH AUTOMATION TOOLS

(71) Applicant: SAP SE, Walldorf (DE)

(72) Inventors: Naveen V, Karnataka (IN); Shanavas Madeen S, Karnataka (IN); Ravikanth Malipeddu, Karnataka (IN); Santhosh Reddy Mereddy, Telangana (IN); Ajith G, Kerala (IN); Prabhat Kumar Singh, Jharkhand (IN); Sushanth B R, Karnataka (IN); Manu Jose Philip, Kerala (IN)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 17/828,268

(22) Filed: May 31, 2022

(65) Prior Publication Data
US 2023/0385181 A1  Nov. 30, 2023

(51) Int. Cl.
  *G06F 11/3698*  (2025.01)
  *G06F 8/36*  (2018.01)
(52) U.S. Cl.
  CPC ............ *G06F 11/3698* (2025.01); *G06F 8/36* (2013.01)
(58) Field of Classification Search
  None
  See application file for complete search history.

(56) References Cited

U.S. PATENT DOCUMENTS 10,169,206 B2 * 1/2019 Magre ................ G06F 11/3692
10,509,717 B1 * 12/2019 Surana ............... G06F 11/3684
2013/0318503 A1 * 11/2013 Li ...................... G06F 11/3684
  717/126
2015/0046909 A1 * 2/2015 Ligman .............. G06F 11/3688
  717/131
2018/0011780 A1 * 1/2018 Aggarwal .............. G06F 11/36
2018/0137035 A1 * 5/2018 Magre ................ G06F 11/3692
2020/0073686 A1 * 3/2020 Hanke .................... G06F 18/22

OTHER PUBLICATIONS

IBM, "Searching for objects in the repository", 2021, https://www.ibm.com/docs/en/spss-modeler/18.2.0?topic=repository-searching-objects-in (Year: 2021).*
Scientech Easy, "Creating Object Repository in Selenium WebDriver using Properties file", 2020, Scientech Easy (Year: 2020).*

* cited by examiner

*Primary Examiner* — Hossain M Morshed
(74) *Attorney, Agent, or Firm* — Buckley, Maschoff & Talwalkar LLC

(57) ABSTRACT

According to some embodiments, systems and methods are provided, including a memory storing processor-executable code; and a processing unit to execute the executable program code to: execute an automation test for a user interface application, wherein execution of the automation test includes accessing a web-object; determine whether the web-object is included in an object repository; in a case it is determined the web-object is not included in the object repository, create the web-object in the object repository; and in a case it is determined the web-object is included in the object repository: determine whether the accessed web-object includes at least one different property from the web-object included in the object repository; and update the web-object included in the object repository with the at least one different property in the accessed web-object. Numerous other aspects are provided.

19 Claims, 11 Drawing Sheets

| PROPERTY NAME | BEFORE | AFTER |
|---|---|---|
| ACTION_TYPE | Button | Button |
| APP_IDENTIFIER | OverdueReceivablesKPI-analyzeSBKPIOverdueReceiveables | OverdueReceivablesKPI-analyzeSBKPIOverdueReceiveables |
| BINDING_PATH | XTOL_REFRESH_CURRENT 1102 | XTOL_REFRESH_CURRENT 1102 |
| ELEMENT_CLASS_NAME | OverdueReceiveablesKPI-analyzeSBKPIOverdueReceiveables | OverdueReceiveablesKPI-analyzeSBKPIOverdueReceiveables |
| ELEMENT_ID | __button10 | __button11 |
| ELEMENT_LABEL | Refresh | now |
| ELEMENT_LOCATOR | {"controltype":"sap.ui.core.Icon","viewId":"SSB__SAP_FI_AR_OVERDUERECEIVABLES_TODAY", "properties":{"":"","src":{"regex":"source:sap-icon://refresh"}}} 1102 | {"controltype":"sap.ui.core.Icon","viewId":"SSB__SAP_FI_AR_OVERDUERECEIVABLES_TODAY", "properties":{"":"","src":{"regex":"source:sap-icon://refresh"}}} 1102 |
| ELEMENT_TYPE | sap.ui.core.Icon | sap.ui.core.Icon |
| NEAR_BY_ELEMENT | Value State Error&~&Emphasized&~&Open on Key Date&&Display Currency | Value State Error&~&Emphasized&~&Open on Key Date&&Display Currency |
| PAGE_IDENTIFIER | Overdue Receiveables | Overdue Receiveables |

FIG. 11

RE-USABLE WEB-OBJECTS FOR USE WITH AUTOMATION TOOLS

BACKGROUND

Many organizations are increasingly dependent on software user interface (UI) applications, executed on-premise or in the cloud, that are developed to address their needs. Application development teams are constantly changing and updating applications to address these needs. These changing and updated applications are growing complex with added integrations and functionalities. These UI applications may be tested by an automation tool to verify function and/or non-functional requirements via automated test scripts. The automation tool may be an application/software that is separate from the software being tested to control the execution of test scripts, and the comparison of actual outcomes with predicted outcomes. The automation tool may simulate the actions of an end user physically using the application, and the end user's interaction with web objects (e.g., elements on a web page including text, graphics, URLs and scripts). However, with the evolution of the UI applications, the automated testing may become more challenging as the tests fail to locate appropriate web objects to perform the tests due to constant changes in the applications. These challenges may increase time and maintenance efforts. Additionally, many organizations may use multiple automation tools to test the applications, with each tool maintaining a collection of needed web objects localized to their respective tools or frameworks. As such, any change to the web objects may increase maintenance efforts, as the resulting changes may need to be incorporated individually in each tool.

Systems and methods are desired which make it easier to maintain web objects used by different automation tools.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a user interface according to some embodiments.

FIG. 4 is a diagram illustrating another user interface according to some embodiments.

FIG. 11 is a table according to some embodiments.

Figure 1:
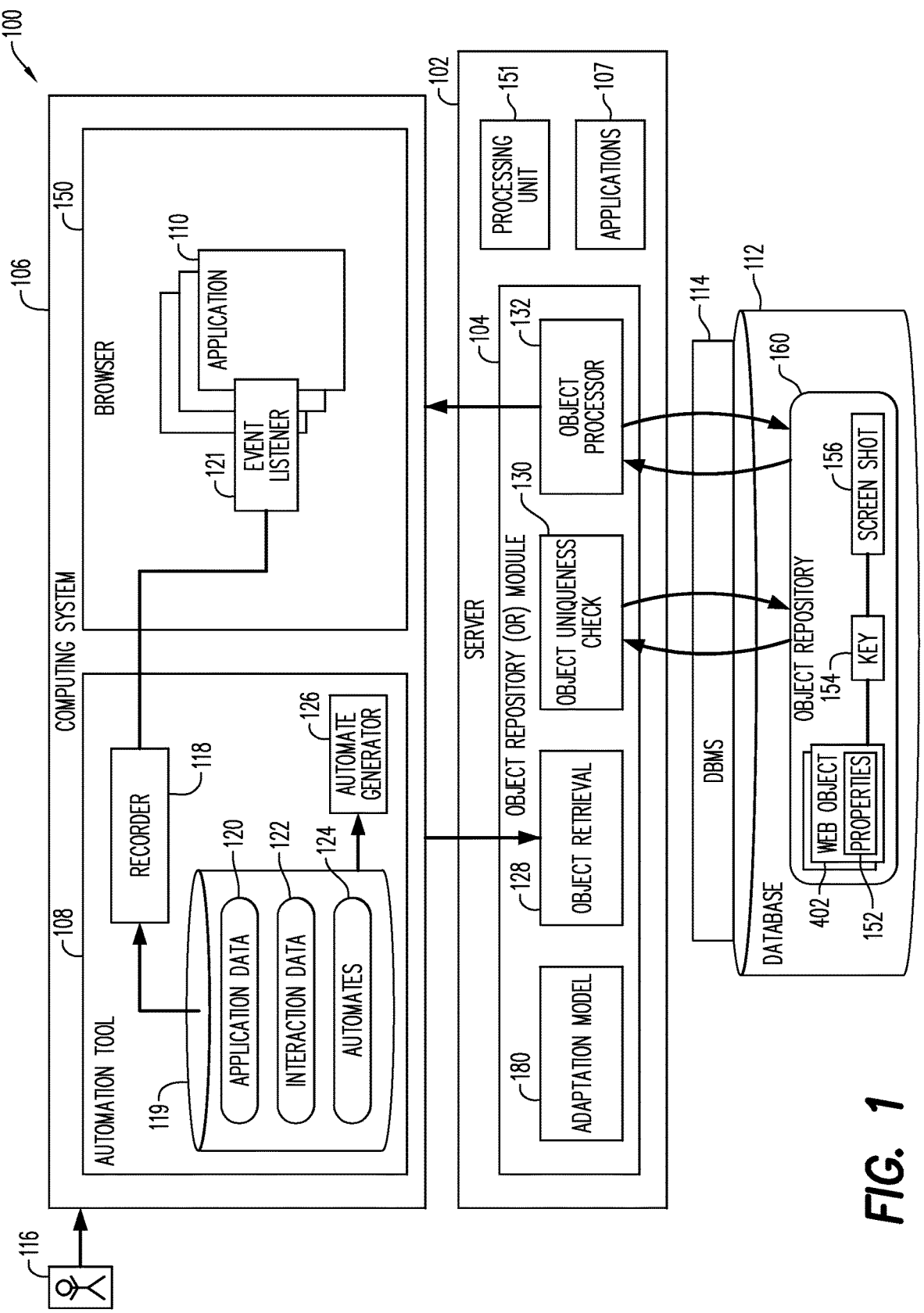
FIG. 1 is a block diagram of an architecture to automatically maintain a single instance of web objects used across automates (tests) and automation tools according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, an automation tool may be used to verify function and/or non-functional requirements of a UI application via automated test scripts. As used herein, the terms "automated test script," "automate," "test," "script," and "automation" may be used interchangeably. The automate may simulate, or mimic, an end user's interaction with the UI application, and in particular, the web objects in the application. Data representing a UI of an application executing on a local computing system may be stored. Based on the stored data, an automation tool generates an automate to cause execution of simulated user interactions on the user interface of the locally-executed application.

There are a variety of ways to generate an automate. A first way, for example, may be code-based. With code-based generation, an automate author writes everything that needs to be included in the test, from the browser launch, to the application under test, the credentials needed, the data, which button should be selected, etc. For example, with respect to button selection, the code may include identification of the button, the action performed by selection of the button, performance of the action including a definition and assertions, etc.

A second way, for example, may be model-based. With model-based generation, the automate author may create multiple models that may be used repeatedly across multiple tests. For example, a first model may be created for a log-in page, a second model may be created for a main page having a header section and footer section, a third model may be created for a menu bar, a fourth model may be created for a header section having search, settings, logout, etc. The automate author may, as part of the model, include all of the properties of all of the web objects in the model.

A third way, for example, may be record-replay-based. With record-replay-based generation, the automate author interacts with the user interface, and these interactions (e.g., every key stroke, etc. and its effect on other information) are recorded as data traces, which associate user actions with logical elements (web objects) of the user interface. In response to a command to generate an automate, the data traces are converted to formats associated with an automation tool and the converted data are transmitted to the automation tool. The automation tool then generates an automate based on the converted data, where the automate is to cause execution of the detected user interactions on the user interface of the locally-executed application. The record-replay-based generation may mimic actual interactions between a user and an application user interface, while avoiding manually defining user interfaces, user interface elements, and user interactions, as with the code-based and model-based methods described above, which may be both time-consuming and error-prone.

While embodiments described herein may be described with respect to a record-replay-based automate generation, other automate generation methods may be used. Irrespective of the method used to generate the automate, a script/code is produced that would accumulate the metadata needed for the test and convert it as user actions at the runtime of the automate.

During execution of the automate, one or more web-objects are accessed. As described above, a web-object is any element on a web page including text, graphics, hyperlinks, etc. that is visible and can be interacted with on the screen. A non-exhaustive example of a web-object is a "copy" button, and selection of this web-object may be included in any number of automates. However, each automation tool may maintain this web-object locally to the tool. As such, this same web-object is stored n-times throughout the organization's automation tools, which increases overhead and uses more memory and bandwidth than an instance where the same web-object was stored less times. Additionally, when the applications are changed/updated, the web-objects may also change. Continuing with the non-exhaustive example of the "copy" button, the text of this button on the user interface may be changed to a "duplicate" button. As such, any automate generated with instructions to access the "copy" button may not execute properly as it cannot find the "copy" button.

By virtue of some embodiments, a central object repository (OR) is built to store web object properties segregated by application name. Along with web object properties, the object repository may also store a screen shot of the web page with the web object highlighted. Embodiments may keep a single instance of the web object across automates and automation tools. The web objects stored in the object repository may be stored with a uniquely generated global unique identifier (GUID). Embodiments may capture web objects in each application by one of: providing a process whereby all web objects in a current web application are scanned, identified, grouped and saved in the object repository, or capturing, via an intelligent engine, integrated into runtime of any automation tool, that can capture all web objects during execution of an automated test. Consequently, there is one central repository of web objects across tools, as needed, for all automates. Additionally, since there is one instance of a given web object at any point in time in the object repository, and it's being referenced by multiple automates, there is a high re-usability of the web objects, which greatly reduces overhead and maintenance costs and increases ease of maintenance of web objects. In the case of the web objects that have changed from the time the automate was created, embodiments may execute a Machine Learning (ML)-based algorithm model (e.g., a Cosine Similarity algorithm or a Natural Language Inferences algorithm) to determine to the closest possible web-object from the automate, the appropriate web-object for the automate to use during runtime, and may try to adapt the automate(s) to use the object. Adaptation/updating of the web-object by the ML-based model may resolve the problem of the mutated web-objects due to upgrades/changes to the objects, for example. This may provide a high reliability of automate executions since the execution will use the latest/most up-to-date web-object reference. As a non-exhaustive example, conventionally it may take a user ten minutes to adapt the automate (e.g., run through the automate, check what has changed, adapt the automate/web object accordingly and change its properties accordingly). If such a web object is used in five of that user automates alone (which may be a low number), and there are 350 users using this same web object in respective five automates, the total effort spent by these users to change their automates for one change is around 17500 minutes (5*350*10), which is approximately 300 hours. By virtue of some embodiments, the total effort spent may be reduced to zero, as the adaptation is handled automatically so that the automates work seamlessly.

Embodiments provide for different automation tools and/or tests to rely on a single source of web-object repository (the central OR) for their uninterrupted automate execution. An advantage of storing all web-objects for a given application in a central OR is re-usability, as any automation tool using web-objects as part of automates may refer to the central OR, fetch web-object properties and consume them for automated testing processes. Embodiments may also provide user friendly access and implementation of objects with reference from the object repository as a microservice. Further, the ML model provides dynamic adaptation of the OR with the latest/most up-to-date web-object properties. Embodiments provide very low to no maintenance for the automation.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Architecture 100 includes a server 102, an object repository (OR) module 104, a local computing system 106 including an automation tool 108 and browser 150, application under test 110, a database 112, a database management system (DBMS) 114, and a user 116.

The server 102 may include applications 107. Applications 107 may comprise server-side executable program code (e.g., compiled code, scripts, etc.) executing within the server 102 to receive queries/requests from clients 116, via the local computing system 106, and provide results to clients 116 based on the data of database 112, and the output of the OR module 104. A client 116 may access, via the automation tool 108, the OR module 104 executing within the server 102, to generate and/or execute test cases, as described below. An example of an application 107 may be the application under test 110 by the automation tool 108.

The server 102 may provide any suitable interfaces through which users 116 may communicate with the OR module 104 or applications 107 executing thereon. The server 102 may include a Hyper Text Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

Local computing system 106 may comprise a computing system operated by local user 116. Local computing system 106 may comprise a laptop computer, a desktop computer, or a tablet computer, but embodiments are not limited thereto. Local computing system 106 may consist of any combination of computing hardware and software suitable to allow system 106 to execute program code to cause the system 106 to perform the functions described herein and to store such program code and associated data.

Generally, computing system 106 executes one or more of applications 107 to provide functionality to user 116. Applications 107 may comprise any software applications that are or become known, including but not limited to data analytics applications. As will be described below, applications 107 may comprise web applications which execute within a web browser 150 of system 106 and interact with corresponding remote cloud-based applications to provide desired functionality. User 116 may instruct system 106 as is known to execute one or more of applications 107 and may interact with resulting displayed user interfaces of the executing applications 107 to obtain the desired functionality therefrom.

The automation tool 108 may include a recorder 118. The recorder 118 may comprise program code executable by system 106 to generate and store data representing user interactions with applications 107. Storage device 119 represents any suitable combination of volatile (e.g., Random Access Memory) and non-volatile (e.g., fixed disk) memory used by system 106 to store the data generated by recorder 118. For example, application data 120 may comprise images of application user interfaces, as well as data defining various web-objects of such user interfaces. A web object may be defined by its location and dimensions within a user interface, its type (e.g., text box, drop-down menu, selectable toggle), application URL, Page title and any other suitable properties 152. Interaction data 122 may represent individual interactions (e.g., clicks, selections and text entries) of a user with web objects of one or more user interfaces. For example, over a user-designated period of time, recorder 118 may generate interaction data 122, which is stored in the storage device 119, where the interaction data 122 indicates a sequence of user interactions performed on various web-objects of a user interface. In embodiments, an event listener 121 may be associated with the application 107 when the user invokes the recorder 118. The event listener 121 may be attached to the application and may "listen"/wait for an event to occur. The event listener 121 may be connected to an event object that defines the event. Here, the event may be any interaction with a web-object. The event listener 121 identifies a given action is performed on a given web-object and sends a notification to the OR module 104 identifying the web-object and the action performed thereon. It is noted that the recorder 118 may attach the event listener 121 at a time when the application is opened. Performing the user interaction invokes/triggers the event listener.

Recorder 118 may also export application data 120 and interaction data 122 to server 102 and OR module 104. Server 102 may comprise an on-premise server, a cloud-deployed virtual machine, or any other suitable computing system to provide the functions described herein.

Automation tool 108 may also include program code executable to provide automate generator 126. According to some embodiments, automate generator 126 receives selected application data 120 and interaction data 122 from recorder 118, and generates an automate 124. Storage system 119 stores automates 124.

According to some embodiments, one or more automates 124 may be scheduled for local execution by local computing system 106. The local computing system 106 may execute automates 124 for the application under test 110 according to their respective schedule. The applications under test 110 may be tested by the automation tool 108. Execution of an automates 124 may include invocation of one or more applications (if not already invoked on system 106), and performance of activities of the automation on respective user interface web objects of the application in the sequence designated by the automation. The automation tool 108 may then verify the results of the executed automate with expected results.

The OR module 104 may include an object retrieval element 128, an object uniqueness check element 130, and an object processor 132.

Responsive to a request from the automation tool 108 to provide all the web-objects from an application and screenshots of the application, the object retrieval element 128 may include program code to retrieve the web-objects and screenshots from the Object Repository (OR) 160 and provide the parameters and details of the web-objects and screen shots to the automation tool 108.

In some embodiments, an object processor 132 may include program code to obtain the details of the web-objects from the applications under test 110 and update the OR 160. The object processor 132 may also interact with an object uniqueness check element 130. The object uniqueness check element 130 may be a microservice that includes program code to check the uniqueness of the web-object before storing the web-object in the OR 160 to avoid data redundancy, and to store the updated properties.

One or more applications 107 executing on server 102 or local computing system 106 may communicate with DBMS 114 using database management interfaces such as, but not limited to, Open Database Connectivity (ODBC) and Java Database Connectivity (JDBC) interfaces. These types of applications 107 may use Structured Query Language (SQL) to manage and query data stored in database 112.

DBMS 114 serves requests to store, retrieve and/or modify data of database 112, and also performs administrative and management functions. Such functions may include snapshot and backup management, indexing, optimization, garbage collection, and/or any other database functions that are or become known. DBMS 114 may also provide application logic, such as database procedures and/or calculations, according to some embodiments. This application logic may comprise scripts, functional libraries and/or compiled program code. DBMS 114 may comprise any query-responsive database system that is or becomes known, including but not limited to a structured-query language (i.e., SQL) relational database management system.

Server 102 may provide application services (e.g., via functional libraries) which applications 107 may use to manage and query the data of database 112. The application services can be used to expose the database data model, with its tables, hierarchies, views and database procedures, to clients. In addition to exposing the data model, server 102 may host system services such as a search service.

Database 112 may store data used by at least one of: applications 107 and the OR module 104. For example, database 112 may store an object repository 160, which may be a micro-service that stores web-objects 402 therein, accessed by the OR module 104 during execution thereof.

Database 112 may comprise any query-responsive data source or sources that are or become known, including but not limited to a structured-query language (SQL) relational database management system. Database 112 may comprise a relational database, a multi-dimensional database, an extensible Markup Language (XML) document, or any other data storage system storing structured and/or unstructured data. The data of database 112 may be distributed among several relational databases, dimensional databases, and/or other data sources. Embodiments are not limited to any number or types of data sources.

Presentation of a user interface as described herein may comprise any degree or type of rendering, depending on the type of user interface code generated by the server 102/local computing system 106.

For example, a client 116 may execute a Web Browser to request and receive a Web page (e.g., in HTML format) from a website application 107 of server 102 to provide the UI 300/400 via HTTP, HTTPS, and/or Web Socket, and may render and present the Web page according to known protocols.

Figure 2:
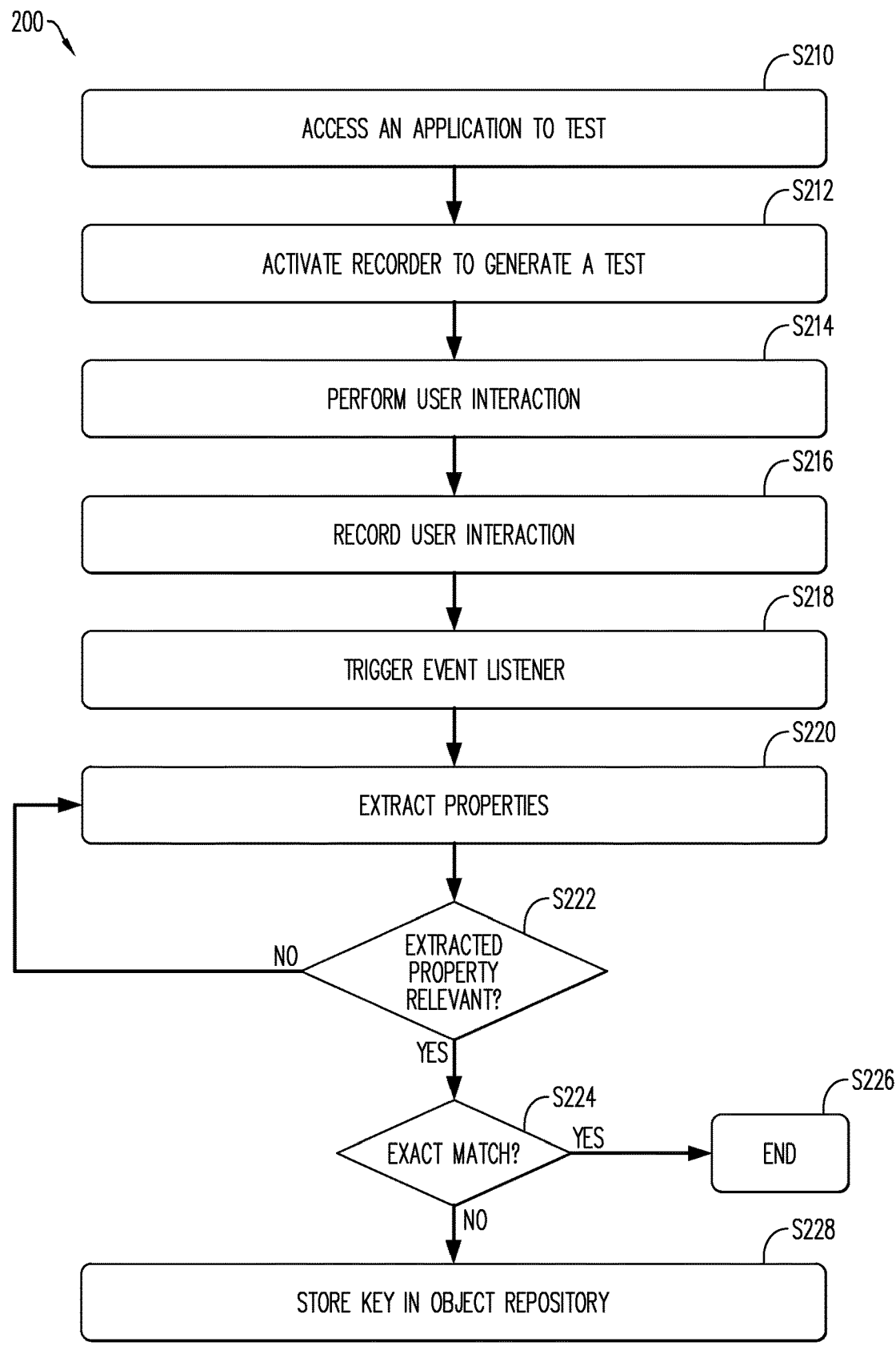
FIG. 2 is a flow diagram of a process according to some embodiments.
Figure 5:
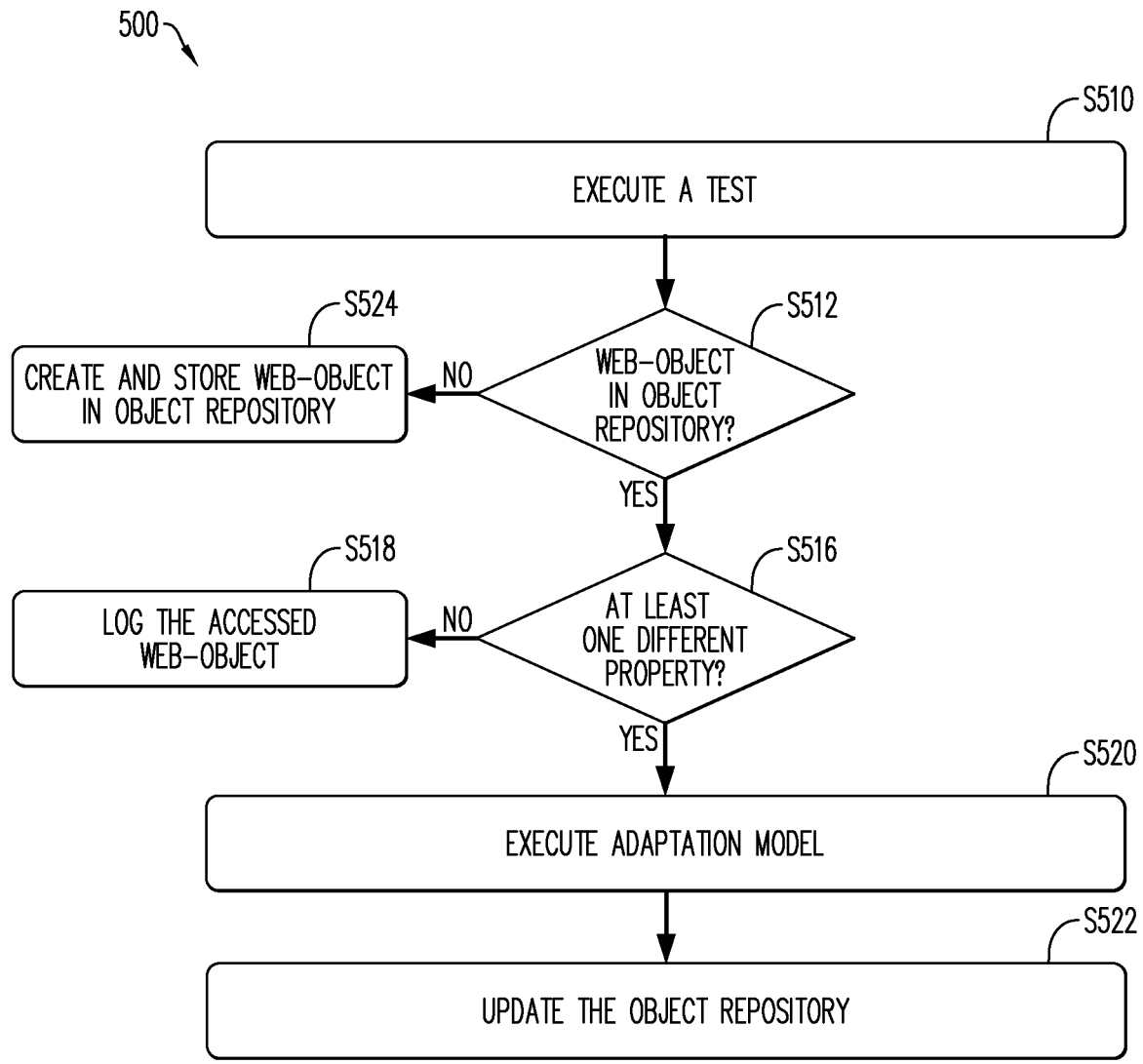
FIG. 5 is a flow diagram of a process according to some embodiments.

FIGS. 2 and 5 illustrate a method 200 of authoring a test; and a method 500 of executing a test, respectively, in accordance with an example embodiment. For example, the methods 200/500 may be performed by a database node, a cloud platform, a server, a computing system (user device), a combination of devices/nodes, or the like, according to some embodiments. In one or more embodiments, the computing system 106 or server 102 may be conditioned to perform the process 200/500, such that a processing unit 151 (FIG. 1) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
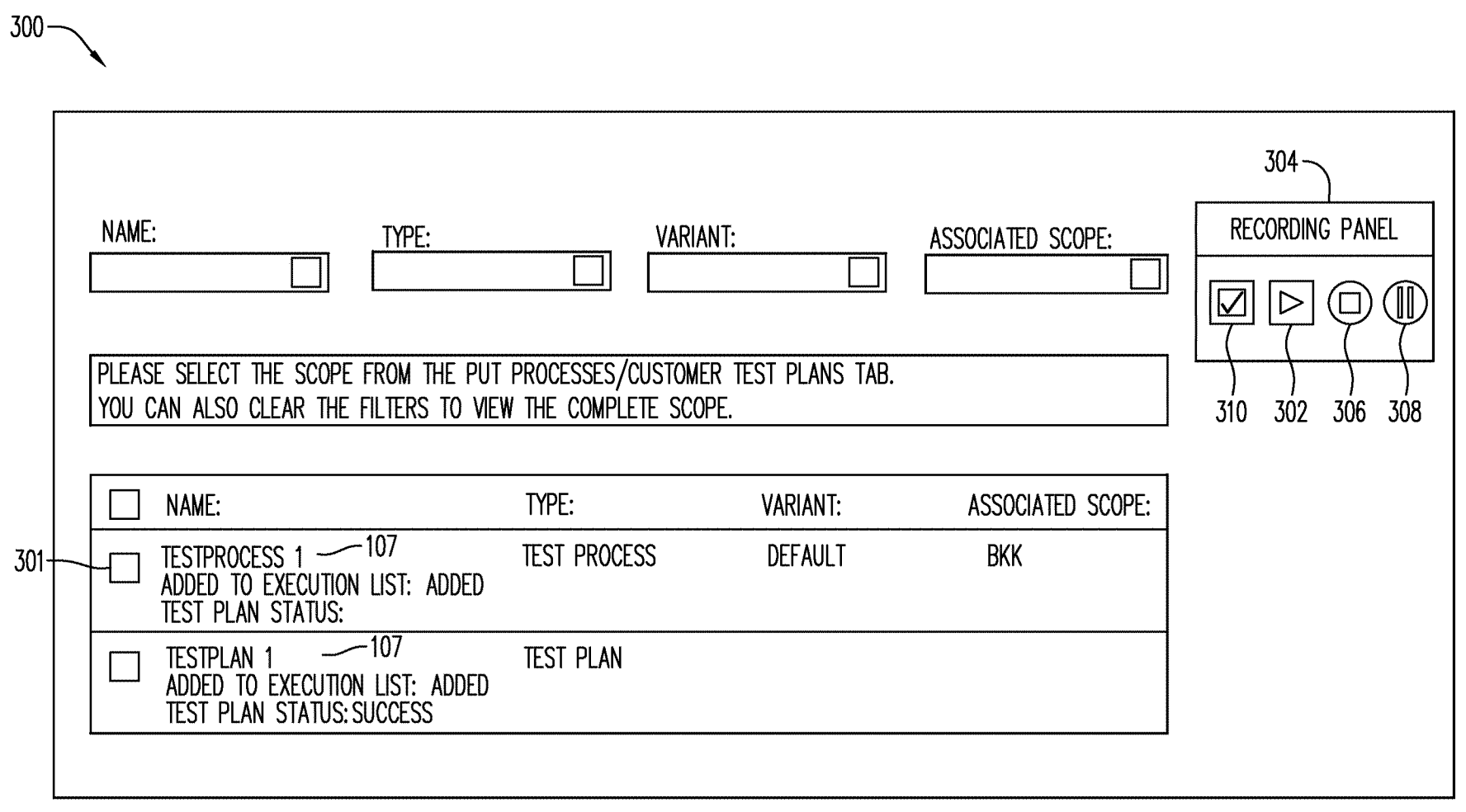

Initially, at S210, a user 116 accesses an application under test 110 to test via automation tool 108. Here in FIG. 3, the user 116 is presented with a user interface 300 that presents two applications 107 available for testing. The user 116 may select one of the applications via check-box 301 or any other suitable selector. Then in S212, the user 116 activates the recorder 118 to generate a test by recording the user actions. The user 116 may activate the recorder 118 by selecting a "record" button 302 from a recording panel 304. The recording panel 304 may also include a "stop" button 306, a "pause" button 308, and a "complete" button 310. As will be appreciated, rather than using buttons to activate and manipulate the recorder 118, the user interface 300 may instead include a text/data-entry field, menu or other selectable element to manipulate the recorder.

Figure 4:
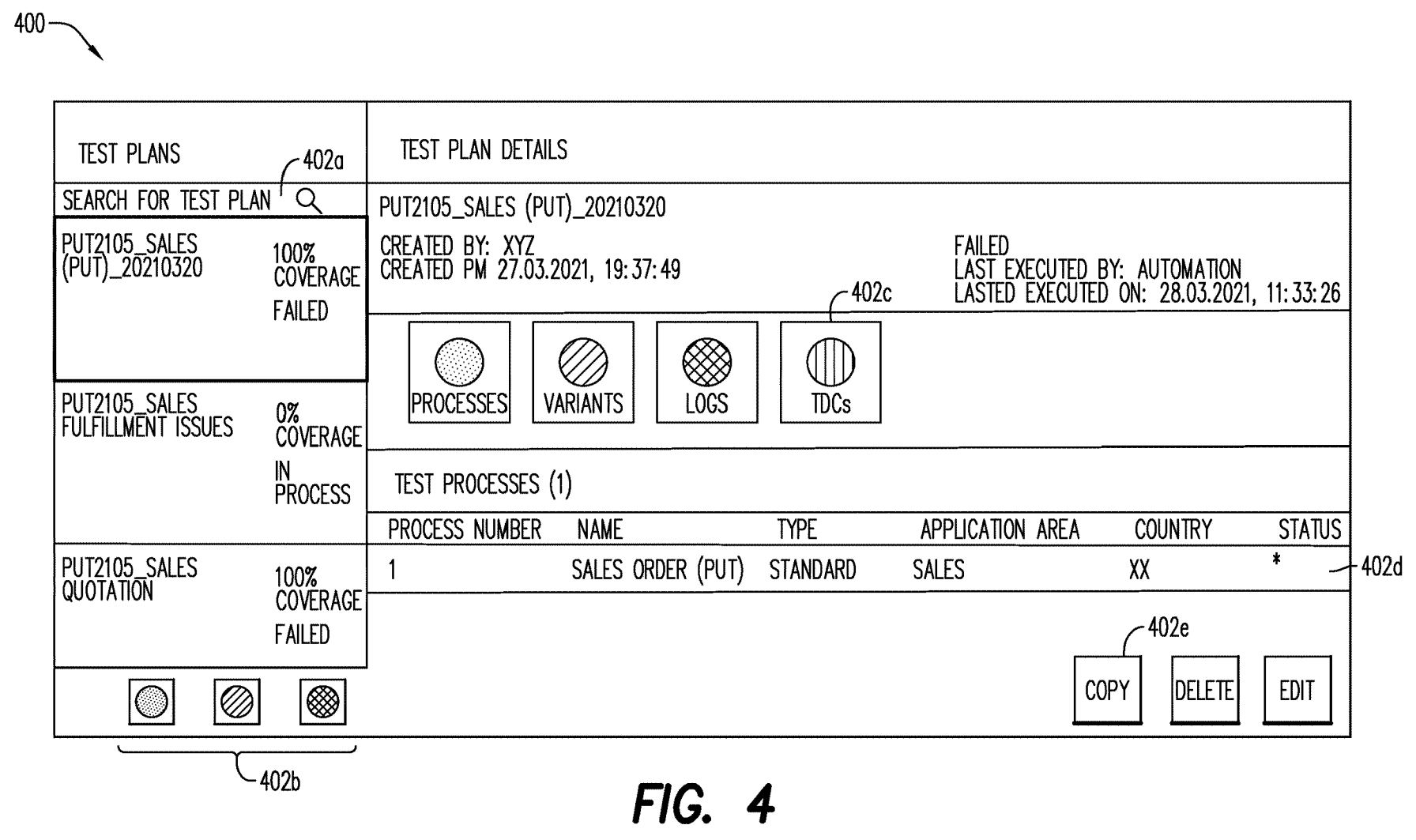

In some embodiments, selection of the "record" button 302 executes the selected application. Here, FIG. 4 is a non-exhaustive example of a user interface 400 of the selected application after execution thereof by selection of the "record" button 302. The user interface 400 includes a plurality of web-objects 402. As described above, a web-object is any element on a web page including text, graphics, URLs and scripts, etc. that can be interacted with. Here, non-exhaustive examples of web-objects are the "Search for Test Plan" data entry box 402a, the buttons 402b at the bottom of the Test Plan panel, the buttons 402c in the Test Plan Details panel, the link 402d in the Test Processes panel, and the buttons (e.g., re-execute, resume, edit, copy, delete) 402e at the bottom of the Test Plan details panel.

Next, at S214, a first user interaction with the web-object 402 is performed. Continuing with the example described above, the user 116 selects the "copy" button 402e. A first user interaction with the web-object 402 is recorded by the recorder 118 at S216. Performance of the user interaction also triggers the event listener 121 at S218 to send a notification to the OR module 104 identifying the accessible web-object that received the user interaction, and the action performed thereon.

The OR module 104 extracts one or more properties from the web-object at S220. In some embodiments, an Application Programming Interface (API) may be used to extract the properties from the web-object 402. Non-exhaustive examples of properties are application URL, page title, web-object type and web-object locators.

The object uniqueness check element 130 may be a microservice that includes program code to determine the uniqueness of the web-object and determine whether the web-object is already available in the Object Repository (OR) 160. The object uniqueness check element 130 may be a Machine Learning (ML) model. At S222, for each extracted property, the object uniqueness check element 130 determines whether the extracted property is relevant for matching to a OR property 152 stored in the object repository (OR) 160. In a case the object uniqueness check element 130 determines the extracted property is not relevant for matching at S222, the object uniqueness check element 130 analyzes the next extracted property to determine whether it is relevant for matching. It is noted that the object may include a plurality of properties, and less than all of those properties may be key properties relevant for the key. In some instances, all of the properties may be key properties. In a case the object uniqueness check element 130 determines the extracted property is relevant for matching at S222, the object uniqueness check element 130 determines whether an exact match for the extracted property exists in the OR 160 at S224. There may be multiple combinations of properties that may be used by the object uniqueness check element 130 to identify whether extracted properties and the web object matches the stored properties 152 of a web object in the OR 160. In embodiments, the object uniqueness check element 130 may rank the properties for the given web-object to determine relevancy. The object uniqueness check element 130 may then dynamically concatenate the properties having a pre-defined relevancy level, and determine whether the concatenated properties are present in the OR 160. The concatenated properties may be referred to herein as a "key" 154. In embodiments, the relevancy of particular properties may be based on a user interface framework used by the application being tested. It is noted that there are particular User Interface (UI) technologies that may be used as related to a webpage. While each webpage may primarily be created in Hyper Text Markup Language (HTML), there may be different UI frameworks which are available to design the webpage, including but not limited to, React® framework, or AngularJS® framework. In one or more embodiments, the object uniqueness check element 130 may have rules for each framework. For example, if framework A is used, then use properties 1, 2 and 3 and concatenate them to make a unique combination/key representing the web-object so that web-object can be located in the OR 160 at a later time, and the properties of that web-object retrieved during execution of the automate. The inventors note that the key may be at the framework level because otherwise it may be too cumbersome for each application to finalize the combination of properties. The object uniqueness check element 130 may dynamically determine which of the current properties for the application/control should be concatenated as a key that may be used to determine whether the key already exists in the OR 160. As a non-exhaustive example, if properties 1, 2 and 3 are extracted, the object uniqueness check element 130 may determine that because application X is under test, only properties 1 and 2 are relevant, and then the object uniqueness check element 130 checks the OR for a key including properties 1 and 2. A system for training the object uniqueness check element 130 is described further below with respect to FIGS. 7 and 8.

Continuing with the process 200, in a case there is an exact match of keys in S224, the process ends at S226, as the key and therefore the web-object is already in the OR 160. When the key/web-object is already stored in the OR 160, another entry does not need to be created since there is only one entry for each object. It is noted that this object may be used across applications/automates. As a non-exhaustive example, a description field may be available across applications. The web-object for the description field may only need to be stored once in the OR 160 with the given properties. As such, when the user interaction is with the description field, the OR module 104 does not need to recreate the description field object in the OR 160 and instead may directly reference the control to this object in the automate.

In a case there is not an exact match in S224, the OR module 104 creates the key by saving the concatenated properties dynamically determined by the object uniqueness check element 130 as the key 154 and stores the key 154 in the OR 160 as a key for that web-object at S228.

In one or more embodiments, when a key 154 is created for a web-object, the GUID associated with the key 154 is then returned to the automate 124 so that it becomes part of the test itself, and may be used during a validation process, as described further below. Steps S214-S228 may be repeated for each user interaction.

Turning to FIG. 5, a process 500 for executing the automate 124 is provided. When the automate 124 is running, a validation process executed by the object processor 132 may identify references to particular web-objects in every user action and try to validate the web-object with the OR 160 to determine whether the web-object is available in the OR 160. In the case the web-object is available in the OR 160, the automate 124 continues to execute the test with the properties for that web-object, as retrieved from the OR 160 by the object retrieval element 128. In the case the web-object is not available in the OR 160, the OR module 104 may create a key for the web-object, store it in the OR 160, and execute the automate 124 with the properties of the web-object.

Initially, at S510, an automate 124 is executed for a user interface application. Execution of the automate test 124 includes accessing a web-object. In embodiments, a screen shot 156 of the current state of the application at a time each web-object is accessed is stored in the OR 160.

It is noted that the process 500 described herein occurs during the point of the automate when the web-object is accessed. For example, a web-object may not be accessed until the automate is on the fourth or fifth UI screen of the automate, and as such, the process 500 is not executed until this time. As a non-exhaustive example, the automate is for a user's application for a leave of absence. The user selects the type of leave that they want to apply for (e.g., illness/causal/paternity, etc.) on a first UI screen. Selection of leave type triggers the display of a second UI screen including a drop-down menu of a calendar for the user to select the number of days for the leave. Selection of the days triggers the display of a third UI screen including additional controls. During the beginning of the test, only the first UI screen is available, so the drop-down calendar web-object, for example, is not present on the screen for the matching process described further below.

Then, in S512, for each accessed web-object 602 (FIG. 6) it is determined whether a corresponding web-object 402 is included in the OR 160. This determination may be part of the validation process executed by the object processor 132. The validation process may determine whether the accessed web-object 602 is already included in the OR 160 as an OR web-object 402 by comparing the key 604 attached to the accessed web-object 602 with the keys 154 in the OR 160. As described above, the key 154 is unique for every web-object. The key 154 is attached or linked to the web-object during the process 200 described above, and becomes part of the automate.

It is noted that in some instances, when a web-object has an attached key, it follows that the web-object will be included in the OR 160, as the web-object is attached to the key as part of the storage process of storing the web-object 402 into the OR 160. However, there are other instances when there may be a different case of web-object authoring, and the key for the web-object was not associated with a web-object in the OR 160. It is further noted that in some instances, the automate may have been generated/authored prior to the existence of the OR 160, or the automate may have been created by a process different from that described in FIG. 2 and the accessed web-object 602 does not have a key attached thereto.

Turning back to the process 500, in a case it is determined at S512 that the accessed web-object 602 is not included in the OR 160, the OR web-object 402 is created and stored with its attached key 154 in the OR 160, in S514. The process to create and store the web-object and attached key in the OR 160 may include S220-S228, as described above with respect to FIG. 2.

In a case it is determined at S512 that the accessed web-object 602 is included in the OR 160 as corresponding OR web-object 402, it is determined at S516 whether the accessed web-object 602 (e.g., the web-object included in the test) includes at least one different property from the OR web-object 402 (e.g., the web-object included in the OR). It is possible that the particular accessed web-object 602 may have undergone a change from when the corresponding OR web-object 402 was authored/stored in the OR 160 (e.g., with continuous changes to applications, web-objects may change). The determination of the accessed web-object including at least one different property from the OR web-object may include the identification of one or more properties of the accessed web-object, the identification of one or more properties of the OR web-object, and a comparison of the identified properties.

It is noted that while the key used in S512 to identify whether the accessed web-object 602 is a match to a corresponding OR web-object 402 may be created from a concatenation of properties, once created the key may be independent of the properties themselves. It is noted that there may be web-object properties that change but are properties that are not relevant for the key of that web object, such that when there is a change to the non-key-relevant properties, the key may stay the same. It is further noted, that in a case one of the key-relevant properties change, the key will also change As a non-exhaustive example, consider the copy button 402*e* (FIG. 4). The copy button may be stored in the OR 160 with the text "C.O.P.Y" property being used as a key to identify the web-object button. However, in the test environment, the UI has changed, and the "copy" button is now the "duplicate" button, which may present a problem because the properties of the duplicate button are now not an exact match for the properties of the copy button, so the automate cannot retrieve the properties for the button from the OR 160 to execute the automate. While the change in this example is a visual change, in other examples, other properties may have changed.

In a case it is determined in S516 that the accessed web-object 602 is the same as the OR web-object 402 (i.e., all the properties are the same), the accessed web-object 602 is logged for processing as part of the executed automate in S518, and the object retrieval element 128 may retrieve the OR properties 152 for the automate 124. In one or more embodiments, the OR module 104 determines the accessed web-object 402 is the same as the OR web-object 602 because the OR module 104 identifies a match of properties for the accessed web-object with the OR properties 152 attached to the OR web-object 402.

In a case it is determined at S516 that despite the key match, the accessed web-object 602 is different from the OR web-object 402, an adaptation model 180 is executed in S520 to identify or predict, based on a ranking of the identified properties in the accessed web-object and the OR web-object, the OR web-object 402 best matches the accessed web-object 602. The adaptation model 180 may be a Machine Learning (ML) algorithm such as, but not limited to, Cosine Similarity and Natural Language Inferences. In one or more embodiments, the OR module 104 determines the accessed web-object is different from an OR web-object in a case that an exact match of properties is not found. The adaptation model 180 may receive as input the properties of the OR web-object 402 attached to the key that matches the key attached to the accessed web-object 602. The adaptation model 180 may also receive the stored screen shot 156 of the current state of the application at the time the web-object is accessed. The adaptation model 180 locates the accessed web-object 602 based on the screen shot 156 and one or more properties of the OR web-object 402. The executed adaptation model 180 may determine the accessed web-object is a closest match for a given OR web-object based on a weighted and ranked analysis of the differences in properties between the two web-objects. Continuing with the copy/duplicate button example, the adaptation model 180 may analyze the properties of the "copy" button as compared to the properties of other objects available on the application at the time, as per the screen shot. In this example, the only property that has changed between the copy button and the duplicate button is the label of the object (e.g., "duplicate" instead of "copy"), while the location property, for example, has remained the same. The adaptation model 180 may then determine that the duplicate button web-object is a closest match for the copy button web-object stored in the OR, as this difference between the two web-objects is the least significant difference as compared to the differences between the properties of the OR web-object and other web-objects in the screen shot.

Figure 6:
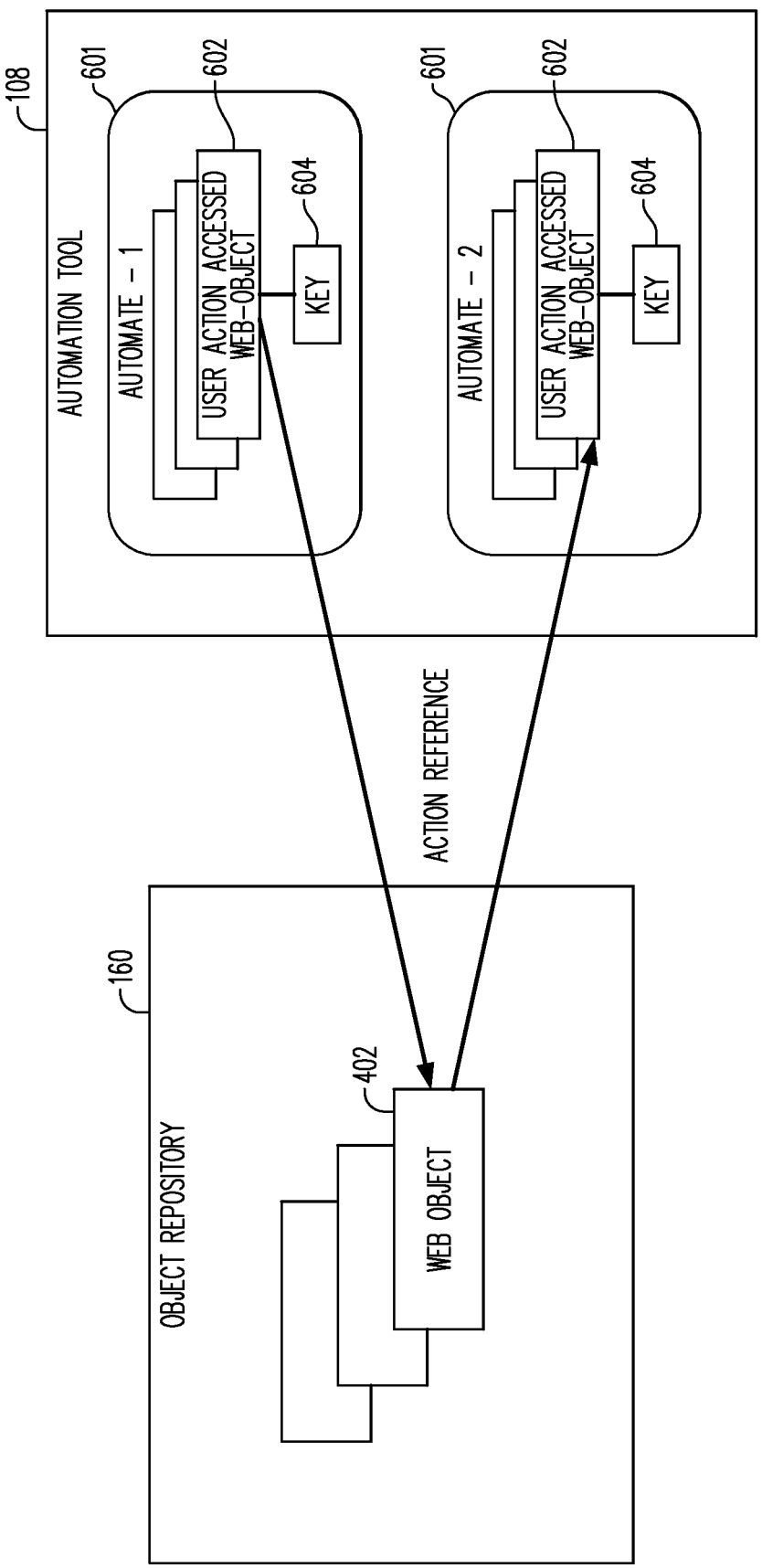
FIG. 6 is a block diagram according to some embodiments.

Then in S522, the OR module 104 updates the OR 160 so that the properties of the accessed web-object replace the properties of the OR web-object. After OR 160 is updated, that update is reflected for that application in all automates that use that application. For example, as shown in FIG. 6, two tests 601—automate 1 and automate 2—of automation tool 108 may both execute actions that reference a same web-object of a same OR 160, and the arrows indicate that the OR 160 is updated per the web-object in automate 1, and that updated web-object is used by automate 2.

Figure 10A:
FIG. 10A is a diagram illustrating a user interface according to some embodiments.
Figure 10B:
FIG. 10B is a diagram illustrating a user interface according to some embodiments.

As another non-exhaustive example, consider the refresh button 1002 in the user interface 1000 shown in FIG. 10A. This button has changed to a "now" button 1052 in the user interface 1050 FIG. 10B. FIG. 11 provides a table 1100 including properties of the web-object before and after the change. It is noted the ELEMENT_ID AND ELEMENT_LABEL properties have changed for the web object, and the properties in the box 1102 are the properties to identify the control/button. These non-DOM dependent properties may be captured using technology specific APIs.

Figure 7:
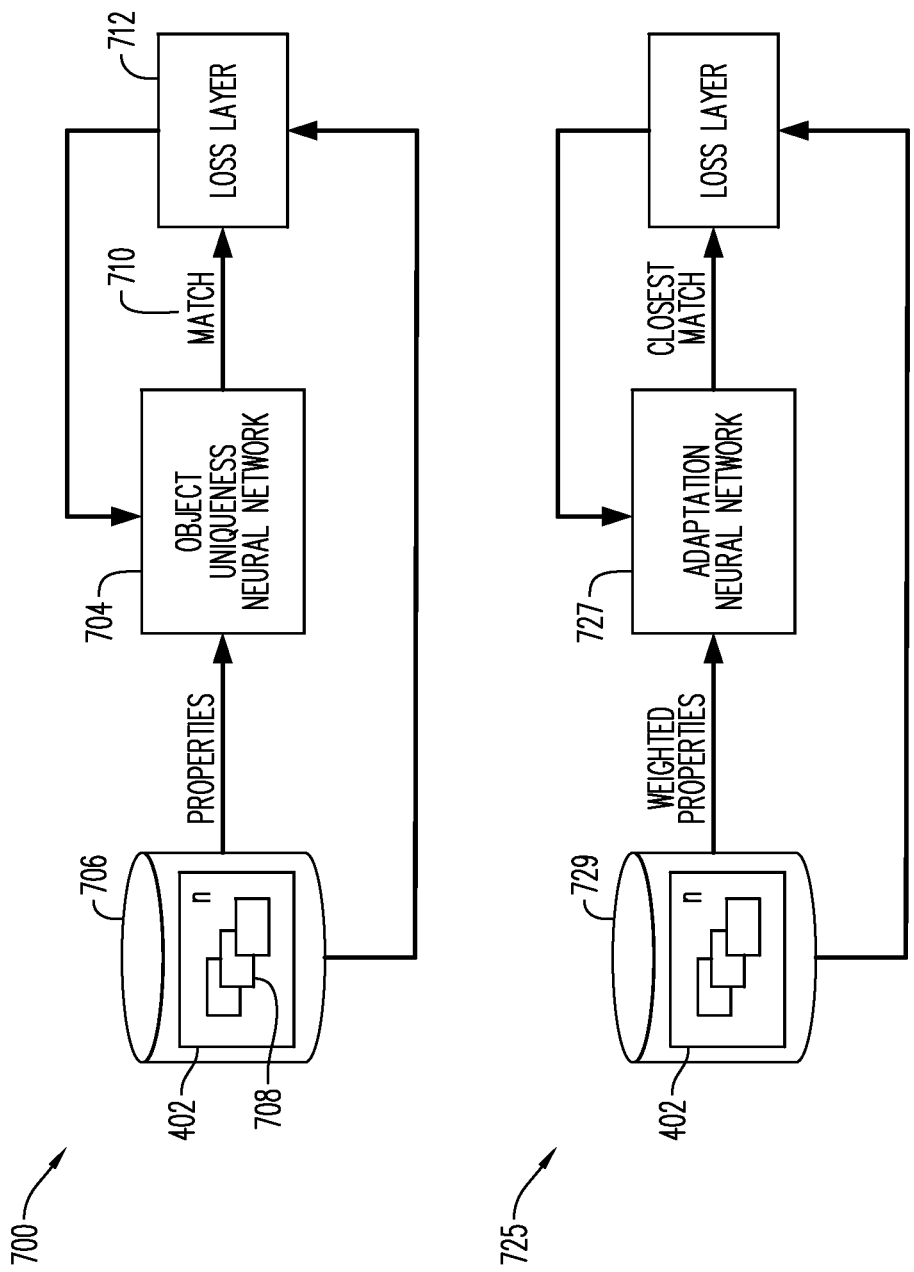
FIG. 7 illustrates a plurality of systems to train an adaptation model and an object uniqueness element according to some embodiments.
Figure 8:
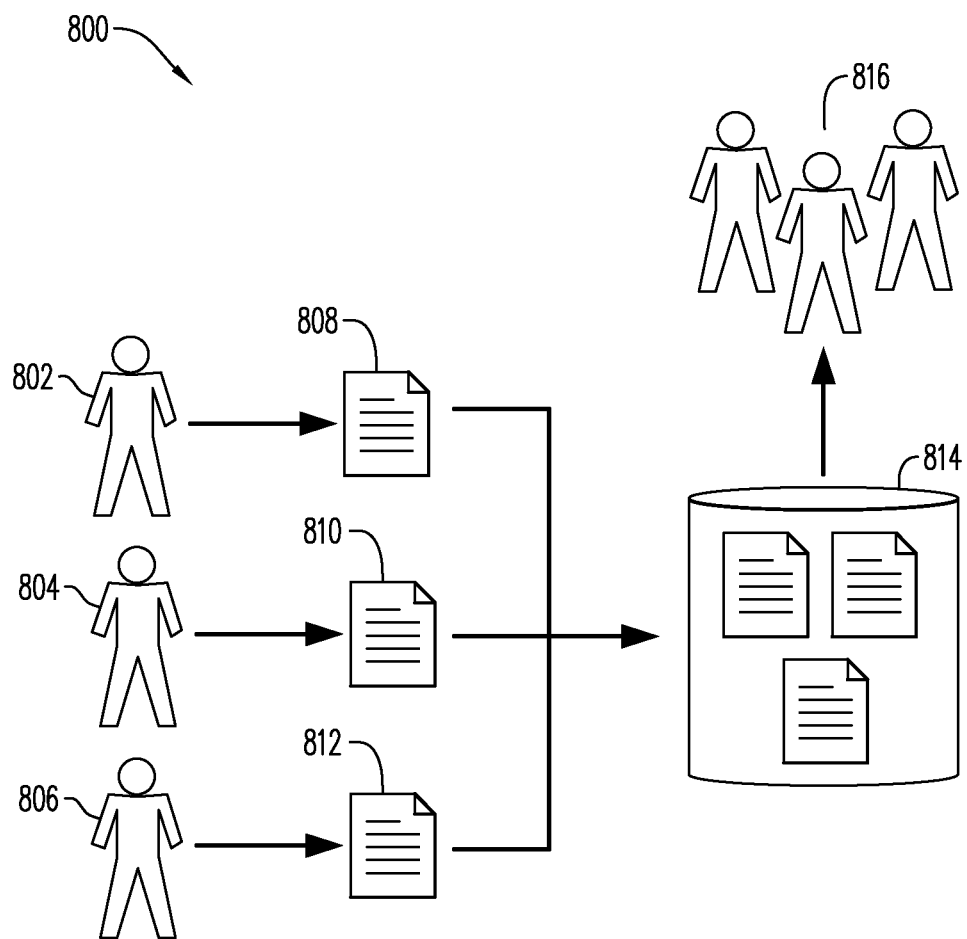
FIG. 8 illustrates a development architecture for a system according to some embodiments.

FIG. 7 illustrates a system 700 for training the object uniqueness check element 130 and a system 725 for training the adaptation model 180, which may each be a Machine Learning (ML) model according to some embodiments.

Each neural network may comprise a network of neurons which receive input, change internal state according to that input, and produce output depending on the input and the internal state. The output of certain neurons is connected to the input of other neurons to form a directed and weighted graph. The weights as well as the functions that compute the internal state can be modified by a training process based on ground truth data as is known in the art. The neural networks may comprise any one or more types of suitable artificial neural network that are or become known, including but not limited to convolutional neural networks, recurrent neural networks, long short-term memory networks, deep reservoir computing and deep echo state networks, deep belief networks, and deep stacking networks.

FIG. 7 illustrates training of an object uniqueness neural network 704 and adaptation neural network 727. The following will describe the training of a single neural network, and in particular the matching neural network 704.

Training data 706 comprises n web-objects, where each web-object includes one or more properties 708. The match between web-object associated with each set of properties may have been generated by a conventional process as described with respect to FIG. 8, to which embodiments are not limited.

System 800 may comprise a conventional development architecture. Users 802, 804, 806 may execute developed code in combination with applications and receive web-objects having associated properties 808, 810, 812 therefrom. Web-objects and the properties thereof are submitted (or committed) to a central repository 814 as is known in the art.

The central repository 814 may be on-premise or cloud-based and may be managed by a single application provider to ensure compliance with internal and general coding standards and policies.

In embodiments, Reviewers 816 (FIG. 8) generate unique identifiers for each web-object stored in the central repository 814. In one or more embodiments, the Reviewer 816 may first identify all of the properties associated with each web-object. Then for each identified property, the Reviewers 816 may classify each property as being relevant for matching and/or uniquely identifying the web-object.

One or more embodiments may determine training data for these web-objects (i.e., the ground truth resolution corresponding to a given web-object). For example, the matching neural network 704 described by embodiments may be trained by analyzing the properties of the web-objects that successfully and uniquely identify the web-object. Once the network model is built, dependency charts may be created to be used in future use cases. It is noted that initially, the neural network may use one or more pre-defined metrics to compare the properties of ground truth web objects to train the neural network.

In the parlance of neural network training, each match 710 is considered ground truth data corresponding to a respective one of web-objects. In one or more embodiments, the web-objects may be stored in a database, or any other suitable store. The various devices described herein might be combined according to embodiments of the present invention.

During training, the OR module 104 extracts properties from each web-object and inputs those properties into the neural network. The term "property" may refer to, as non-limiting examples, application URL, page title, web-object type and web-object locators.

The type and number of properties extracted from the web-object may be optimized using domain-knowledge and/ or a property discovery process. Based on its initial configuration and design, the neural network 704 outputs a predicted match for the input web-object to an OR web-object 402. Loss layer component 712 determines a loss by comparing the predicted matched web-object based on a given input web-object properties with the actual matched web-object and properties. A loss is determined for each web-object in order to determine a total loss. The loss may comprise an L1 loss, and L2 loss, or any other suitable measure of total loss known in the art.

The total loss is backpropagated from loss layer component 712 to the neural network 704. As is known in the art, the internal weights of the neural network 704 are modified in response to the total loss. The foregoing process repeats until it is determined that the total loss has reached an acceptable level or training otherwise terminates.

At termination of the training, the trained neural network may be a trained network model including information about a decision boundary created via the supervised learning. The decision boundary may be a boundary that separates the input properties into particular web-objects. Thus, a decision boundary may be automatically calculated for a model using supervised learning. According to some embodiments, the decision boundary might be associated with a line, a hyperplane, a non-linear boundary separating one category from another category, and/or a plurality of decision boundaries. Moreover, a decision boundary might comprise a multi-class decision boundary separating multiple categories.

System 700 and 725 may comprise any system or systems for training an artificial neural network that are or become known. For example, any of training system 700 and 725 may employ supervised learning, unsupervised learning and/or reinforcement learning used as a function approximator as is known in the context of deep neural networks. Generative adversarial networks may be used including a generative and a discriminative network as is known.

According to some embodiments, each trained neural network may implement a function. The function may be characterized as a set of parameter values associated with each node of the network. In one example, the function is represented by parameter values of kernels of a fully convolutional network. The function (e.g., embodied in parameter values of trained convolutional kernels) may be deployed as is known in the art to another system.

The system 725 for training the adaptation neural network 727 may train the adaptation neural network 727 to output a trained adaptation neural network model, in a similar manner to that described above with respect to the training of the matching neural network 704. The training of the adaptation neural network 727 may use different inputs than the object uniqueness neural network 704 and result in different outputs. Notably, the input to the adaptation neural network 727 may be training data 729 comprising web-objects with weighted properties that are ranked to predict a closest—but not exact—match. The model output from the adaptation neural network 727 may be operative determine a web-object is a closest match for a stored web-object based on the differences between the properties of the web-objects being least significant as compared to other stored web-objects. In some embodiments, the adaptation neural network 727 may decide there is no closest match.

Figure 9:
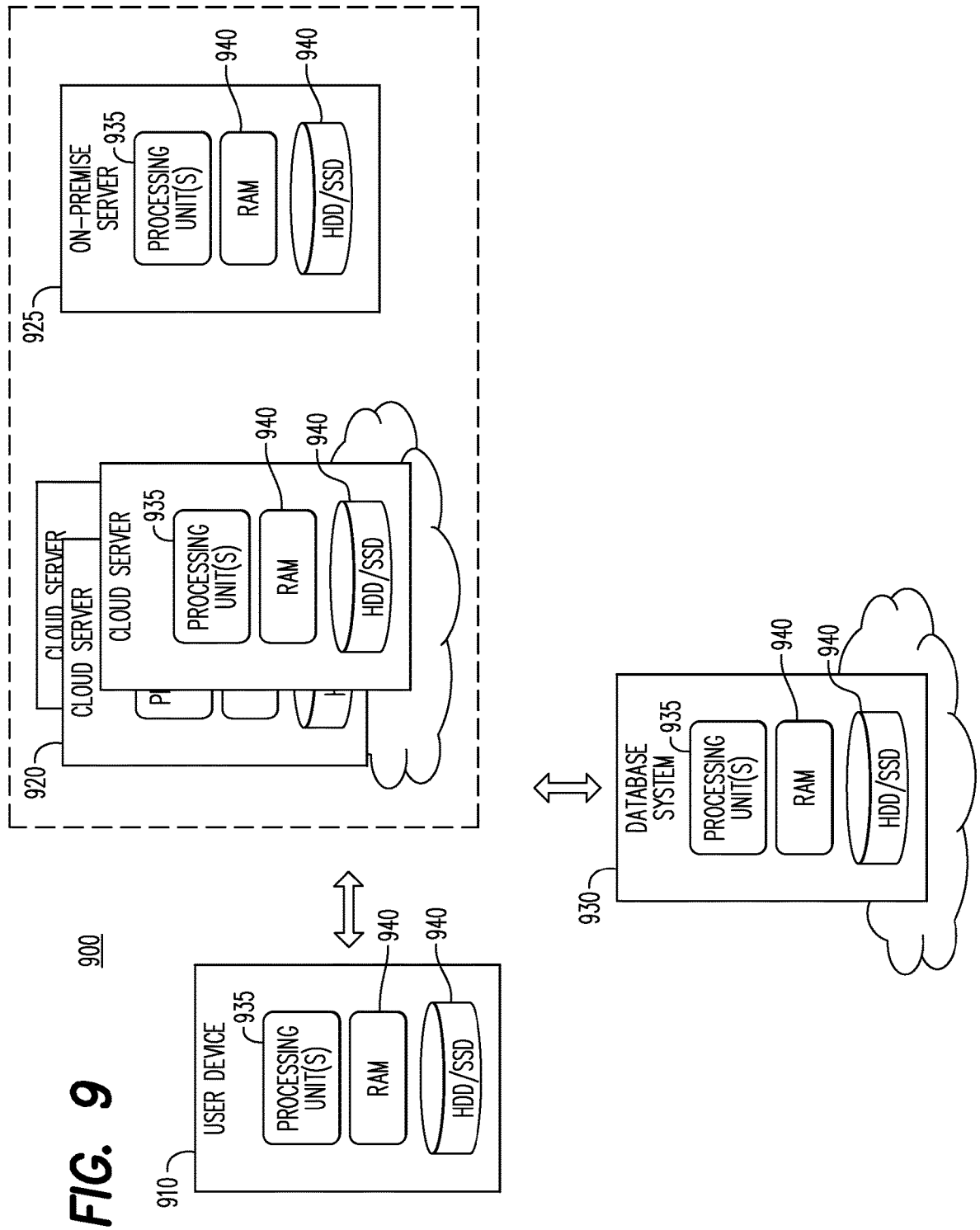
FIG. 9 is a block diagram of a cloud-based database deployment architecture according to some embodiments.

FIG. 9 illustrates a cloud-based database deployment 900 according to some embodiments. The illustrated components may reside in one or more public clouds providing self-service and immediate provisioning, autoscaling, security, compliance and identity management features.

User device 910 may interact with applications executing on one of the cloud application server 920 or the on-premise application server 925, for example via a Web Browser executing on user device 910, in order to create, read, update and delete data managed by database system 930. Database system 930 may store data as described herein and may execute processes as described herein to cause execution of web-object authoring and storage and execution of an automate to test an application on the user device 910. Cloud application server 920 and database system 930 may comprise cloud-based compute resources, such as virtual machines, allocated by a public cloud provider. As such, cloud application server 920 and database system 930 may be subjected to demand-based resource elasticity. Each of the user device 910, cloud server 920, on-premise server 925, and database system 930 may include a processing unit 935 that may include one or more processing devices each including one or more processing cores. In some examples, the processing unit 935 is a multicore processor or a plurality of multicore processors. Also, the processing unit 935 may be fixed or it may be reconfigurable. The processing unit 935 may control the components of any of the user device 910, cloud server 920, on-premise server 925, and database system 930. The storage devices 940 may not be limited to a particular storage device and may include any known memory device such as RAM, ROM, hard disk, and the like, and may or may not be included within a database system, a cloud environment, a web server or the like. The storage 940 may store software modules or other instructions/executable code which can be executed by the processing unit 935 to perform the method shown in FIGS. 2 and 5. According to various embodiments, the storage device 940 may include a data store having a plurality of tables, records, partitions and sub-partitions. The storage device 940 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processing unit to execute the processor-executable program code to:
   generate unique identifiers for each web-object stored in an object repository by identifying all of the properties associated with each web-object, and classifying each of the identified properties for each stored web-object as relevant or non-relevant for matching the stored web-object, wherein relevancy is predetermined by a reviewer;
   create a unique key for each stored web-object, the unique key created from a concatenation of relevant properties, wherein changes to non-relevant properties of the web-object do not affect the key value of the stored web-object;
   execute an automation test for a user interface application, wherein execution of the automation test includes accessing a web-object;
   determine whether the accessed web-object is included in the object repository by extracting properties of the accessed web-object, creating a key value for the accessed web-object by concatenating the extracted properties that are relevant for matching, and comparing the created key value for the accessed web-object with each unique key created for each stored web-object;
   in a case it is determined the web-object is not included in the object repository, create the web-object in the object repository; and
   in a case it is determined the web-object is included in the object repository:
   determine whether the accessed web-object includes at least one different property from the web-object included in the object repository; and
   update the web-object included in the object repository with the at least one different property in the accessed web-object.

2. The system of claim 1, wherein creation of the web-object in the object repository comprises:
   extraction of one or more automation properties from the web-object;
   identification of a unique combination of automation properties for the web-object;
   creation of the unique key for the web-object based on the identified unique combination; and
   association of the unique key with the web-object and storage of the unique key and web-object in the object repository.

3. The system of claim 2, wherein identification of the unique combination of automation properties further comprises:

identification of a user interface framework type.

4. The system of claim 2, wherein the determination of whether the accessed web-object includes at least one different property from the web-object included in the object repository further comprises:
   identification of one or more properties of the accessed web-object;
   identification of one or more same properties of a web-object in the object repository; and
   prediction, via a machine learning algorithm, that the web-object in the object repository corresponds to the accessed web-object.

5. The system of claim 4, wherein the prediction is based on a ranking of the identified one or more properties in the accessed web-object and the web-object in the object repository.

6. The system of claim 4, wherein predicting that the web-object in the object repository corresponds to the accessed web-object further comprises the processing unit to further execute the executable program code to:
   receive a screen shot of a user interface, of the user interface application, at a time the web-object was accessed;
   receive the properties of the web-object stored in the object repository based on the unique keys;
   locate the accessed web-object in the application based on the screen shot and the received properties of the web-object stored in the object repository;
   determine the accessed web-object is a closest match for the web-object stored in the object repository; and
   update the web-object stored in the object repository with the properties of the accessed web-object.

7. The system of claim 1, wherein the determination of whether the unique key is attached to the web-object further comprises processor-executable program code to:
   rank a plurality of properties included for the web-object, wherein each rank is associated with a relevancy level;
   for each property of the plurality of properties having the pre-defined relevancy level, concatenate the properties based on the rules for the given framework used by the user interface application; and
   determine whether the concatenated properties are present in the object repository.

8. A method comprising:
   generating unique identifiers for each web-object stored in an object repository by identifying all of the properties associated with each web-object, and classifying each of the identified properties for each stored web-object as relevant or non-relevant for matching the stored web-object, wherein relevancy is predetermined by a reviewer
   creating a unique key for each stored web-object, the unique key created from a concatenation of relevant properties, wherein changes to non-relevant properties of the web-object do not affect the key value of the stored web-object;
   executing an automation test for a user interface application, wherein execution of the automation test includes accessing a web-object;
   determining whether the accessed web-object is included in the object repository by extracting properties of the accessed web-object, creating a key value for the accessed web-object by concatenating the extracted properties that are relevant for matching, and comparing the created key value for the accessed web-object with each unique key created for each stored web-object;
   in a case it is determined the web-object is not included in the object repository, creating the web-object in the object repository; and
   in a case it is determined the web-object is included in the object repository:
      determining whether the accessed web-object includes at least one different property from the web-object included in the object repository; and
      updating the web-object included in the object repository with the at least one different property in the accessed web-object.

9. The method of claim 8, wherein creating of the web-object in the object repository comprises:
   extracting one or more automation properties from the web-object;
   identifying a unique combination of automation properties for the web-object;
   creating the unique key for the web-object based on the identified unique combination; and
   associating the unique key with the web-object and storing the unique key and web-object in the object repository.

10. The method of claim 9, wherein identifying the unique combination of automation properties further comprises:
    identifying of a user interface framework type.

11. The method of claim 8, wherein the determination of whether the accessed web-object includes at least one different property from the web-object included in the object repository further comprises:
    identifying one or more properties of the accessed web-object;
    identifying one or more same properties of a web-object in the object repository; and
    predicting, via a machine learning algorithm, that the web-object in the object repository corresponds to the accessed web-object.

12. The method of claim 11, wherein the prediction is based on a ranking of the identified properties in the accessed web-object and the web-object in the object repository.

13. The method of claim 11, wherein predicting that the web-object in the object repository corresponds to the accessed web-object further comprises:
    receiving a screen shot of a user interface, of the user interface application, at a time the web-object was accessed;
    receiving the properties of the web-object stored in the object repository based on the unique keys;
    locating the accessed web-object in the application based on the screen shot and the received properties of the web-object stored in the object repository;
    determining the accessed web-object is a closest match for the web-object stored in the object repository; and
    updating the web-object stored in the object repository with the properties of the accessed web-object.

14. A non-transitory, computer readable medium having executable instructions stored therein to perform a method, the method comprising:
    generating unique identifiers for each web-object stored in an object repository by identifying all of the properties associated with each web-object, and classifying each of the identified properties for each stored web-object as relevant or non-relevant for matching the stored web-object, wherein relevancy is predetermined by a reviewer
    creating a unique key for each stored web-object, the unique key created from a concatenation of relevant properties, wherein changes to non-relevant properties of the web-object do not affect the key value of the stored web-object;

executing an automation test for a user interface application, wherein execution of the automation test includes accessing a web-object;

determining whether the accessed web-object is included in the object repository by extracting properties of the accessed web-object, creating a key value for the accessed web-object by concatenating the extracted properties that are relevant for matching, and comparing the created key value for the accessed web-object with each unique key created for each stored web-object;

in a case it is determined the web-object is not included in the object repository, creating the web-object in the object repository; and in a case it is determined the web-object is included in the object repository:

determining whether the accessed web-object includes at least one different property from the web-object included in the object repository, the determination further comprising:

predicting, via a machine learning algorithm, that the web-object in the object repository corresponds to the accessed web-object, the prediction further comprising:

receiving a screen shot of a user interface, of the user interface application, at a time the web-object was accessed;

receiving the properties of the web-object stored in the object repository based on the unique keys;

locating the accessed web-object in the application based on the screen shot and the received properties of the web-object stored in the object repository;

determining the accessed web-object is a closest match for the web-object stored in the object repository; and updating the web-object included in the object repository with the at least one different property in the accessed web-object.

15. The medium of claim 14, wherein creating of the web-object in the object repository comprises:

extracting of one or more automation properties from the web-object;

identifying of a unique combination of automation properties for the web-object;

creating the unique key for the web-object based on the identified unique combination; and associating the unique key with the web-object and storing the unique key and web-object in the object repository.

16. The medium of claim 15, wherein identifying the unique combination of automation properties further comprises:

identifying of a user interface framework type.

17. The medium of claim 14, wherein the determination of whether the accessed web-object includes at least one different property from the web-object included in the object repository further comprises:

identifying one or more properties of the accessed web-object; and identifying one or more same properties of a web-object in the object repository.

18. The medium of claim 17, wherein the prediction is based on a ranking of the identified properties in the accessed web-object and the web-object in the object repository.

19. The medium of claim 17, wherein predicting that the web-object in the object repository corresponds to the accessed web-object further comprises:

updating the web-object in the object repository with the properties of the accessed web-object.

\* \* \* \* \*